Patented Dec. 27, 1949

2,492,420

UNITED STATES PATENT OFFICE 2,492,420

PLASTICIZED COPOLYMERS OF VINYL CHLORIDES

Cecil W. Gayler, Ridley Park, Pa., assignor to American Viscose Corporation, Wilmington, Del., a corporation of Delaware No Drawing. Application July 12, 1945, Serial No. 604,721

11 Claims. (Cl. 260—33.4)

The present invention is concerned with compositions of matter comprising copolymers of vinyl chlorides with acrylonitrile and plasticizers therefor.

Copolymers of vinyl chloride with acrylonitrile having molecular weights of 10,000 to 25,000 and in which the proportion of the latter constituent exceeds 10%, such as those containing from 10 to 55% thereof have a considerably raised softening point as compared to polyvinyl chlorides, but they are subject to severe deterioration and decomposition when fused. This results in the production of discolored, brittle and weak molded and extruded products, particularly the latter, such as filaments, rods, tubes and the like, because of the necessity to have the material extruded in a highly fluid condition.

Such compounds as phenol itself and dibutyl sebacate which are highly satisfactory plasticizers for polyvinyl chlorides have been found to be unsuitable for the acrylonitrile copolymers with vinyl chloride. Those copolymers which have from about 35 to 55% acrylonitrile therein are the most advantageous for the production of molded and extruded articles, and particularly filaments, because of their high softening points. However, while a few volatile solvents have been found which dissolve such copolymers, nevertheless no high-boiling plasticizer for them has heretofore been known.

In accordance with the present invention, it has been found that monohydric alcohols having 5 to 9 carbon atoms are compatible with and serve as plasticizers for the vinyl chloride-acrylonitrile copolymers, and at the same time have the remarkable effect, when compounded in low proportions of about 2 to 10% on the combined weights of the resin and plasticizer, of stabilizing against heat, hardening, toughening and increasing the tensile strength of the products obtained, and especially of filaments made therefrom. From 10 to 20% of these plasticizers increases the flexibility and lowers the hardness but the tensile strength generally remains above that of products formed of the unplasticized copolymers. Above 20%, flexibility increases rapidly and the tensile strength decreases, the product taking on a certain amount of elasticity akin to that of rubber.

Examples of the plasticizers are: amyl alcohol, cyclohexanol, n-heptyl alcohol, benzyl alcohol, phenyl ethyl alcohol, phenyl propyl alcohol, cinnamyl alcohol.

The composition may be formed in any suitable manner. The copolymer in powdered form may be mixed with the plasticizer in liquid or powdered form and then the mixture may either be preliminarily molded into pellets under suitable heat and pressure or the mixture may be milled, such as in the conventional heated two-roll rubber mill. Temperatures of about 80 to 160° C. are generally useful at this stage. After thus obtaining thorough and uniform distribution of the plasticizer through the composition, it may be used for the ultimate molding or extruding in the form of small pellets or ground into powder. The temperature of final molding or extruding is generally dependent upon the temperature at which the preliminary working, i. e. milling or molding, is performed; the higher the latter, the higher the temperature of final forming.

In the following examples, the invention is illustrated by the melt-spinning of filaments, though it is to be understood the composition finds general use for molding or extruding numerous other products:

Example I

A powdered copolymer (92.5 parts by weight) of vinyl chloride and acrylonitrile containing 49% acrylonitrile having an average molecular weight of about 20,000, and an incipient softening temperature of about 130° C. was mixed with 7½ parts by weight of n-heptyl alcohol and the mixture was preliminarily molded at 135° C. The resulting compound had a Rockwell hardness of M-75 and was extruded at about 170° C. through the orifices (of 20 mils diameter) of a spinneret to produce filaments having a tensile strength of 0.91 gram per denier.

In comparison, an unplasticized sample of powdered copolymer does not become welded at temperatures of 130 to 150° C. Heating it to a higher temperature causes rapid decomposition and the molded products obtained were too brittle to test for hardness. The plasticizer has a marked stabilizing effect upon the copolymer, allowing it to be heated to a highly fluid condition at temperatures of 180 to 200° C. without detrimental decomposition.

Example II

A mixture of 7.5 parts of benzyl alcohol and 92.5 parts of the copolymer of Example I was molded at 135° C., and after pulverization, was extruded at 180° C. The filaments obtained had a tensile strength of 1.07 grams per denier and an extensibility of 17.3%.

Example III

A mixture of 7.5% of cyclohexanol and 92.5% of the copolymer of Example I was molded at 135° C., crushed, and extruded at 190° C. to produce filaments which were stretched 100% while treated with steam, giving a product having a tensile strength of 1.17 grams per denier and 7.7% extensibility.

Example IV

A mixture of 7.5 parts of cinnamyl alcohol and 92.5 parts of the copolymer of Example I was molded at 135° C., crushed and extruded at 180° C. After stretching while under treatment with steam, filaments having a tensile strength of 0.97 gram per denier and an extensibility of 9.7% were obtained.

Example V

A mixture of 2 parts of isoamyl alcohol and 98 parts of a copolymer of vinyl chloride and acrylonitrile having 25% of the latter component were worked up at 100° C., crushed, and extruded at 155° C. The filaments obtained were strong and tough.

Example VI

A mixture of 10 parts of iso-octyl alcohol and 90 parts of a copolymer of vinyl chloride and acrylonitrile having 55% of the latter component was worked at 145° C., crushed, and extruded at 190° C. The filaments obtained were flexible, strong and tough.

The filaments thus obtained find especially advantageous usage in the production of stabilized woven, knitted, braided, or other fabrics and felt-like products. Thus the filaments, in continuous form or as staple fibers with or without such non-thermoplastic fibers, as cotton, rayon, wool, silk, linen, and the like (or, if desired, with thermoplastic fibers having higher softening temperatures), may be converted into yarns, and the yarns, after being woven, knitted, braided, or otherwise fabricated, can be subjected to heat, with or without pressure, to effect bonding of the plasticized vinyl chloride-acrylonitrile fibers (because of being rendered adhesive by their thermoplasticity) to themselves and any adjacent fibers where they intermesh. Similarly paper-like and felt-like products may be made from staple fibers of the plasticized vinyl chloride-acrylonitrile copolymers, cut to suitable lengths, and mixed or not with other fibers of non-thermoplastic properties (or, if desired, with thermoplastic fibers having higher softening temperatures). After forming mats of the fibers, by carding, blowing, and the like, the copolymer fibers may be rendered adhesive by heat and the mats may be compacted to any desired density to obtain products of more or less stiffness or flexibility and softness.

The copolymer filaments and fibers are highly resistant to most organic solvents and also to acid and alkaline solutions. They are free of attack by mildew and bacteria in general and have undiminished strength and flexibility in humid atmospheres or even when soaked in water over long periods of time. The fibers and filaments are therefore useful for making filter fabrics, dialyzer membranes, fishing line leaders, strings for tennis rackets, violins and other musical instruments, as well as for making fabrics for industrial and textile uses generally.

It is to be understood that changes and variations may be made herein without departing from the spirit and scope of the invention as defined by the appended claims.

I claim:

1. A composition and molded and extruded products made therefrom including filaments and the like comprising a copolymer of vinyl chloride with acrylonitrile having a molecular weight of 10,000 to 25,000 containing between 10 and 55% of acrylonitrile; and a monohydric alcohol having between 5 and 9 carbon atoms in an amount of 2% to 20% of the combined weights of copolymer and alcohol.

2. A composition and molded and extruded products made therefrom including filaments and the like comprising a copolymer of vinyl chloride with acrylonitrile having a molecular weight of 10,000 to 25,000 containing between 10 and 55% of acrylonitrile; and a monohydric alcohol having between 5 and 9 carbon atoms in an amount of 2 to 10% of the combined weights of copolymer and alcohol.

3. A composition and molded and extruded products made therefrom including filaments and the like comprising a copolymer of vinyl chloride with acrylonitrile having a molecular weight of 10,000 to 25,000 containing between 10 and 55% of acrylonitrile; and cyclohexanol in an amount of 2 to 20% of the combined weights of copolymer and alcohol.

4. A composition and molded and extruded products made therefrom including filaments and the like comprising a copolymer of vinyl chloride with acrylonitrile having a molecular weight of 10,000 to 25,000 containing between 10 and 55% of acrylonitrile; and n-heptyl alcohol in an amount of 2 to 20% of the combined weights of copolymer and alcohol.

5. A composition and molded and extruded products made therefrom including filaments and the like comprising a copolymer of vinyl chloride with acrylonitrile having a molecular weight of 10,000 to 25,000 containing between 10 and 55% of acrylonitrile; and benzyl alcohol in an amount of 2 to 20% of the combined weights of copolymer and alcohol.

6. A composition and molded and extruded products made therefrom including filaments and the like comprising a copolymer of vinyl chloride with acrylonitrile having a molecular weight of 10,000 to 25,000 containing between 10 and 55% of acrylonitrile; and cyclohexanol in an amount of 2 to 10% of the combined weights of copolymer and alcohol.

7. A composition and molded and extruded products made therefrom including filaments and the like comprising a copolymer of vinyl chloride with acrylonitrile having a molecular weight of 10,000 to 25,000 containing between 10 and 55% of acrylonitrile; and n-heptyl alcohol in an amount of 2 to 10% of the combined weights of copolymer and alcohol.

8. A composition and molded and extruded products made therefrom including filaments and the like comprising a copolymer of vinyl chloride with acrylonitrile having a molecular weight of 10,000 to 25,000 containing between 10 and 55% of acrylonitrile; and benzyl alcohol in an amount of 2 to 10% of the combined weights of copolymer and alcohol.

9. A composition and molded and extruded products made therefrom including filaments and the like comprising a copolymer of vinyl chloride with acrylonitrile having a molecular weight of 10,000 to 25,000 containing between 35 to 55% of acrylonitrile; and cyclohexanol in an amount of 2 to 10% of the combined weights of copolymer and alcohol.

10. A composition and molded and extruded products made therefrom including filaments and the like comprising a copolymer of vinyl chloride with acrylonitrile having a molecular weight of 10,000 to 25,000 containing between 35 to 55% of acrylonitrile; and n-heptyl alcohol in an amount of 2 to 10% of the combined weights of copolymer and alcohol.

11. A composition and molded and extruded products made therefrom including filaments and the like comprising a copolymer of vinyl chloride with acrylonitrile having a molecular weight of 10,000 to 25,000 containing between 35 to 55% of acrylonitrile; and benzyl alcohol in an amount of 2 to 10% of the combined weights of copolymer and alcohol.

CECIL W. GAYLER.

REFERENCES CITED

The following references are of record in the file of this patent:

UNITED STATES PATENTS

| Number | Name | Date |
|---|---|---|
| 2,045,979 | Croom | June 30, 1936 |
| 2,310,889 | Becker | Feb. 9, 1943 |
| 2,391,092 | Horback | Dec. 18, 1945 |
| 2,420,330 | Shriver et al. | May 13, 1947 |